G. P. McNIFF.
CYLINDER AND METHOD OF MAKING SAME.
APPLICATION FILED MAR. 18, 1921.
1,420,721. Patented June 27, 1922.
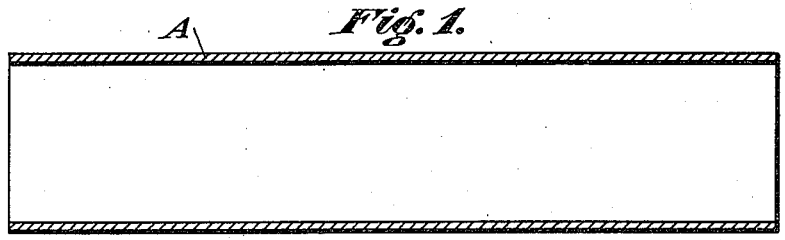
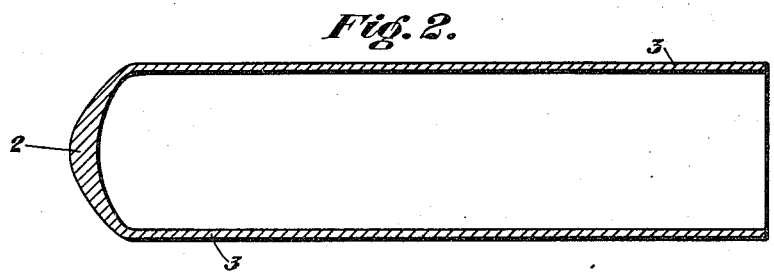
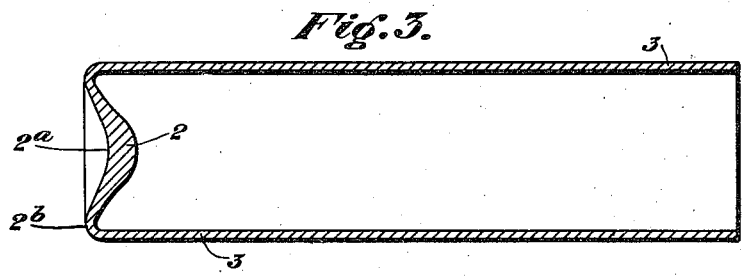
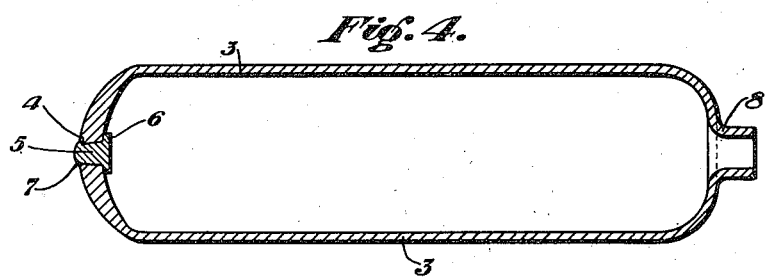
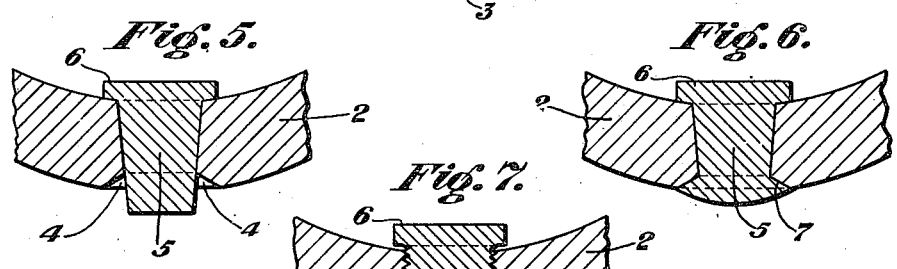
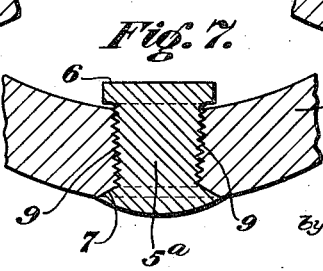
Inventor:
Gilbert P. McNiff

UNITED STATES PATENT OFFICE.

GILBERT P. McNIFF, OF PITTSBURGH, PENNSYLVANIA, ASSIGNOR TO NATIONAL TUBE COMPANY, OF PITTSBURGH, PENNSYLVANIA, A CORPORATION OF NEW JERSEY.

CYLINDER AND METHOD OF MAKING SAME.

1,420,721.

Specification of Letters Patent. Patented June 27, 1922.

Application filed March 18, 1921. Serial No. 453,284.

*To all whom it may concern:*

Be it known that I, GILBERT P. McNIFF, a citizen of the United States, and resident of Pittsburgh, in the county of Allegheny and State of Pennsylvania, have invented certain new and useful Improvements in Cylinders and Methods of Making Same, of which the following is a specification.

This invention relates to cylinders and more particularly to cylinders for high pressure gaseous fluids and the method of manufacturing the same.

The principal object of this invention is to provide a cylinder for high pressure gaseous fluids, that may be made from seamless tubing and have its one end closed by shaping the walls of the cylinder inwardly.

A further object is to reinforce or strengthen the closed end of the cylinder by securing a tapered plug in the central portion or weakest area of the closed end.

Heretofore in manufacturing cylinders of this class the metal forming the end has been weakened, or the joining has been imperfect so that after the cylinders had been completed they would leak in the closed end, and were therefore useless.

It has been the practice to heat the tubes from which the cylinders are formed and to spin the heated metal inwardly to form a closed end, the metal welding together at the center. The central or welded portion has proven to be weak and to develop leaks under pressure. Therefore the present construction has been developed to strengthen and make a fluid-tight end on cylinders of this class.

The several steps in the manufacture of cylinders of this class are clearly illustrated in the accompanying drawings, in which:

Figure 1 is a sectional elevation of a piece of tubing cut to length to make a cylinder.

Figure 2 is a sectional elevation of a piece of tubing similar to Figure 1, with its one end closed by shaping the walls of the tubing inwardly by spinning.

Figure 3 is a view similar to Figure 2, with the bottom cupped so that the cylinder will stand.

Figure 4 is a sectional elevation of a cylinder formed in accordance with this invention, having the central portion of the closed end cut away forming an aperture in which is secured a tapered plug.

Figure 5 is an enlarged fragmentary sectional view of the bottom or closed end of a cylinder showing a smooth tapered plug forced therein.

Figure 6 is a similar view showing the plug welded in position to make a fluid-tight joint.

Figure 7 is an enlarged fragmentary sectional view of the bottom or closed end of a cylinder showing the tapered plug threaded and welded therein.

In carrying out my invention, standard seamless tubing is cut to lengths sufficient to form the desired size of completed cylinder, as shown in Figure 1 and designated by the letter A.

The length of tubing A is then heated and spun, or otherwise shaped inwardly to form a closed bottom end 2 of the cylinder, as shown in Figure 2, the remainder of the tubing forming the side walls 3 of the cylinder. In spinning the walls of the tubing to form the end 2, the edges are brought together at approximately the axis of the tubing under a sufficiently high temperature to weld them.

If desired the bottom closed end 2 may be shaped or forged inwardly to form a concave bottom portion $2^a$ surrounded by a comparatively flat rim $2^b$ as shown in Figure 3, thus forming a bottom wall that will permit the cylinder being stood on end.

After the cylinders have been formed with the closed end 2, the central or welded portion is cut away to form an aperture 4 tapering toward the outer face of the end 2 and a tapered plug 5, having a circumferential shoulder or head 6 formed on its large end, is forced into the aperture 4 from the inside of the cylinder. The plug 5 is then welded to the closed end 2 from the outside thereof forming a fluid-tight joint 7, as clearly shown in Figures 4 and 6.

The weakened or welded central portion of the bottom 2 is thus reinforced or strengthened so as to withstand the high pressure to which these cylinders are subjected.

After the plug has been secured in the closed bottom end wall 2 the opposite end of the cylinder side walls 3 are spun or otherwise shaped inwardly to form a neck portion 8 and forming a completed cylinder.

If desired the aperture 4 may be provided with a screw thread 9 and a screw threaded tapered plug $5^a$ screwed therein as shown in Figure 7, the plug being threaded into the aperture from the inside of the cylinder and having its outer or small end welded to the closed end 2.

Various modifications in construction, design, and combination of parts will readily suggest themselves to those skilled in the art to which this invention belongs, and therefore I do not wish to be limited to the specific embodiments of my invention shown and described, since various modifications may be made without departing from the spirit of my invention as defined in the appended claims.

I claim:—

1. The method of making a high pressure cylinder from tubing, which consists in cutting the tubing to length, shaping the walls of said tubing inwardly adjacent to one end thereof to form a closed bottom, cutting a portion of said bottom away to form an outwardly tapering aperture, and securing a plug in said aperture.

2. The method of making a high pressure cylinder from tubing, which consists in cutting the tubing to length, shaping the walls of said tubing inwardly adjacent to one end thereof to form a closed bottom, cutting a portion of said bottom away at approximately the center thereof to form an aperture, forcing a tapered plug into said aperture from the inside of said cylinder, and securing said plug in position.

3. The method of making a high pressure cylinder from tubing, which consists in cutting the tubing to length, shaping the walls of said tubing inwardly adjacent to one end thereof to form an integral closed end on said cylinder, cutting a portion of said closed end away at approximately the center thereof to form an aperture, and forcing a tapered plug into said aperture from the inside of said cylinder.

4. The method of making a high pressure cylinder from tubing, which consists in cutting the tubing to length, shaping the walls of said tubing inwardly adjacent to one end thereof to form an integral closed end on said cylinder, cutting a portion of said closed end away at approximately the center thereof to form an aperture, and forcing a tapered plug into said aperture from the inside of said cylinder, and welding said plug to the closed end of said cylinder from the outside thereof.

5. The method of making a high pressure cylinder from tubing, which consists in cutting the tubing to length, shaping the walls of said tubing inwardly adjacent to one end thereof to form an integral closed end on said cylinder, cutting a portion of said closed end away at approximately the center thereof, forming a screw thread in said aperture, and screwing a threaded plug into said aperture.

6. The method of making a high pressure cylinder from tubing, which consists in cutting the tubing to length, shaping the walls of said tubing inwardly adjacent to one end thereof to form an integral closed end on said cylinder, cutting a portion of said closed end away at approximately the center thereof, to form a tapered aperture, forming a screw thread in said aperture, screwing a tapered threaded plug into said aperture from the inside of said cylinder, and welding said plug to the closed end of said cylinder from the outside thereof.

7. A high pressure cylinder comprising an integral body portion, an end wall formed integral with said body portion, having a centrally arranged outwardly tapered aperture therein, and a plug secured in said aperture from the inside of said cylinder and welded to said end wall.

8. A high pressure cylinder comprising an integral body portion, an end wall formed integral with said body portion and having a centrally arranged threaded tapered aperture therein, and a threaded tapered plug screwed into said aperture from the inside of said cylinder.

9. A high pressure cylinder comprising an integral body portion, an end wall formed integral with said body portion and having a centrally arranged threaded tapered aperture therein, and a threaded tapered plug screwed into said aperture from the inside of said cylinder, said plug being provided with a shoulder around its inner large end adapted to abut the inner face of said end wall.

10. A high pressure cylinder comprising an integral body portion, an end wall formed integral with said body portion and having a centrally arranged threaded tapered aperture therein, and a threaded tapered plug screwed into said aperture from the inside of said cylinder, said plug being provided with a shoulder around its inner large end adapted to abut the inner face of said end wall, and the outer end of said plug being welded to said end wall, forming a fluid tight joint.

In testimony whereof, I have hereunto signed my name.

GILBERT P. McNIFF.